(12) United States Patent
Togashi (10) Patent No.: US 7,667,950 B2
(45) Date of Patent: Feb. 23, 2010

(54) MULTILAYER CAPACITOR AND ELECTRONIC DEVICE

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 428 days.

(21) Appl. No.: 11/882,018

(22) Filed: Jul. 30, 2007

(65) Prior Publication Data

US 2008/0174934 A1    Jul. 24, 2008

(30) Foreign Application Priority Data

Sep. 12, 2006    (JP) .............................. 2006-246935

(51) Int. Cl.
*H01G 4/228* (2006.01)

(52) U.S. Cl. ................. 361/306.3; 361/303; 361/306.1; 361/321.1; 361/313

(58) Field of Classification Search ............. 361/306.3, 361/303–305, 307, 308.1, 311–313, 321.1, 361/321.2, 306.2, 301.4
See application file for complete search history.

(56) References Cited

U.S. PATENT DOCUMENTS

| | | | | |
|---|---|---|---|---|
| 6,327,134 B1 * | 12/2001 | Kuroda et al. | ................ | 361/303 |
| 6,452,781 B1 * | 9/2002 | Ahiko et al. | ............. | 361/321.2 |
| 6,657,848 B2 * | 12/2003 | Togashi et al. | ........... | 361/306.3 |
| 6,819,543 B2 * | 11/2004 | Vieweg et al. | ........... | 361/306.3 |
| 6,934,145 B2 * | 8/2005 | Hsieh et al. | ............. | 361/321.2 |
| 7,046,500 B2 * | 5/2006 | Lee et al. | .................... | 361/303 |
| 7,439,734 B2 | 10/2008 | Fischer | | |
| 7,567,427 B2 * | 7/2009 | Nagamiya | ................ | 361/321.2 |

FOREIGN PATENT DOCUMENTS

| | | |
|---|---|---|
| JP | A 05-166671 | 7/1993 |
| JP | A-07-226331 | 8/1995 |
| JP | A-11-288839 | 10/1999 |
| JP | A-2001-44074 | 2/2001 |
| JP | A-2001-185449 | 7/2001 |
| JP | A-2004-140183 | 5/2004 |
| JP | A-2004-296940 | 10/2004 |
| JP | A-2005-79237 | 3/2005 |
| JP | A-2005-243912 | 9/2005 |
| JP | A-2005-347314 | 12/2005 |
| JP | A-2008-203259 | 9/2008 |

* cited by examiner

*Primary Examiner*—Nguyen T Ha
(74) *Attorney, Agent, or Firm*—Oliff & Berridge, PLC (57) ABSTRACT

A multilayer capacitor has a laminate body in which a first internal electrode and a second internal electrode are alternately laminated with a dielectric layer in between, a first terminal electrode provided on one end side of the laminate body, and a second terminal electrode provided on the other end side of the laminate body. The first internal electrode has a first lead portion connected to the first terminal electrode. The second internal electrode has a second lead portion connected to the second terminal electrode. The first internal electrode consists of plural types of first internal electrodes and the plural types of first internal electrodes have their respective first lead portions at different positions. Distances between the first lead portions of the respective types of the first internal electrodes and the second lead portion are different from each other.

6 Claims, 12 Drawing Sheets

MULTILAYER CAPACITOR AND ELECTRONIC DEVICE

BACKGROUND OF THE INVENTION

1. Field of the Invention

The present invention relates to a multilayer capacitor consisting of a lamination of dielectrics and internal electrodes, and an electronic device incorporating the same.

2. Related Background Art

A conventionally known multilayer capacitor is, for example, the one as described in Japanese Patent Application Laid-Open No. 5-166671, in which a large-capacitance capacitor and a low-capacitance capacitor are integrally arranged in parallel to form an integral capacitor body and in which an input electrode and an output electrode are provided on the integral capacitor body.

SUMMARY OF THE INVENTION

It is, however, not easy to achieve a desired resonance frequency and impedance, by integrally arranging a plurality of capacitors with different capacitances as in the above-described conventional technology. Therefore, it is difficult to realize a low impedance characteristic across a wide band.

An object of the present invention is to provide a multilayer capacitor and electronic device capable of certainly realizing low impedance across a wide band.

A multilayer capacitor according to the present invention is a multilayer capacitor comprising: a laminate body in which a first internal electrode and a second internal electrode are alternately laminated with a dielectric layer in between; a first terminal electrode provided on one end side of the laminate body; and a second terminal electrode provided on another end side of the laminate body; wherein the first internal electrode has a first lead portion connected to the first terminal electrode; wherein the second internal electrode has a second lead portion connected to the second terminal electrode; wherein the first internal electrode comprises plural types of first internal electrodes and the plural types of first internal electrodes have their respective first lead portions at different positions; wherein distances between the first lead portions of the respective types of the first internal electrodes and the second lead portion are different from each other. Each distance between the first lead portion and the second lead portion herein refers to the shortest distance in a straight line between a connection point of the first lead portion with the first terminal electrode and a connection point of the second lead portion with the second terminal electrode.

Since the multilayer capacitor of this configuration comprises the plural types of first internal electrodes, there are a plurality of capacitor portions each composed of the first internal electrode, the second internal electrode, and the dielectric layer. Incidentally, in order to control the resonance frequency of the capacitor, it is generally necessary to adjust the equivalent series inductance (ESL) or the capacitance of the capacitor. At this time, as the distance decreases between the first lead portion of the first internal electrode and the second lead portion of the second internal electrode, the equivalent series inductance of the capacitor becomes lower and, as a result, the resonance frequency of the capacitor becomes higher. In the multilayer capacitor of the present invention, the first lead portions of the respective types of the first internal electrodes have the different distances from the second lead portion of the second internal electrode, the capacitor portions corresponding to the respective types of first internal electrodes have their respective equivalent series inductances different from each other, and, as a result, the capacitor portions come to have their respective resonance frequencies different from each other. Accordingly, the multilayer capacitor has a plurality of resonance frequencies. This allows us to certainly obtain the multilayer capacitor with low impedance across a wide band. In this connection, since the number of resonance frequencies of the multilayer capacitor increases with increase in the number of types of first internal electrodes, it is feasible to achieve the low impedance across a wider band.

Preferably, the second internal electrode comprises plural types of second internal electrodes, and the plural types of second internal electrodes have their respective second lead portions at different positions; distances between the first lead portions of the respective types of the first internal electrodes and the second lead portions of the respective types of the second internal electrodes are different from each other. In this case, since the number of resonance frequencies of the multilayer capacitor increases with increase in the types of first internal electrodes and second internal electrodes, it is feasible to certainly realize the low impedance across a wider band.

Preferably, at least one type among the plural types of first internal electrodes is divided into a plurality of internal electrodes in a single layer of the laminate body; each of the divided internal electrodes has the first lead portion; areas of the respective divided internal electrodes are different from each other. In this case, a plurality of capacitor portions are formed corresponding to the plurality of divided internal electrodes, and it is thus feasible to increase the number of resonance frequencies of the multilayer capacitor, without increase in the number of layers of first internal electrodes, and to achieve the low impedance across a wider band.

The plural types of first internal electrodes may be formed in a single layer of the laminate body. In this case, the multilayer capacitor can have a plurality of resonance frequencies, while minimizing the number of layers of first internal electrodes. This permits achievement of low impedance across a wide band, while achieving miniaturization of the multilayer capacitor.

In this configuration, preferably, the plural types of first internal electrodes have their respective areas different from each other. When the respective types of first internal electrodes have their respective areas different from each other as in this configuration, the capacitor portions corresponding to the respective types of first internal electrodes come to have different equivalent series inductances and different capacitances. Therefore, it becomes feasible to control the resonance frequencies of the respective capacitor portions more minutely.

The present invention also provides an electronic device comprising a circuit board, and a multilayer capacitor mounted on the circuit board, wherein the multilayer capacitor comprises a laminate body in which a first internal electrode and a second internal electrode are alternately laminated with a dielectric layer in between, a first terminal electrode provided on one end side of the laminate body, and a second terminal electrode provided on another end side of the laminate body; wherein the first internal electrode has a first lead portion connected to the first terminal electrode; wherein the second internal electrode has a second lead portion connected to the second terminal electrode; wherein the first internal electrode comprises plural types of first internal electrodes and the plural types of first internal electrodes have their respective first lead portions at different positions; wherein distances between the first lead portions of the respective types of first internal electrodes and the second lead portion are different from each other; wherein the multilayer capacitor is mounted on the circuit board so that the first and second internal electrodes stay vertical to the circuit board.

In the electronic device of this configuration, the multilayer capacitor comprises the plural types of first internal electrodes, whereby there are a plurality of capacitor portions each composed of the first internal electrode, second internal electrode, and dielectric layer. At this time, the first lead portions of the respective types of first internal electrodes have the different distances from the second lead portions of the second internal electrodes, and thus the respective capacitor portions corresponding to the respective types of first internal electrodes come to have their respective equivalent series inductances different from each other. As a result, the capacitor portions come to have different resonance frequencies. Therefore, the multilayer capacitor has a plurality of resonance frequencies. This allows us to certainly obtain the multilayer capacitor with low impedance across a wide band.

In a state in which the multilayer capacitor is mounted on the circuit board, an electric current flows from the circuit board through the first terminal electrode to the first lead portions of the first internal electrodes, or an electric current flows from the circuit board through the second terminal electrode to the second lead portion of the second internal electrode. At this time, since the first and second internal electrodes stay vertical to the circuit board, the flow path of electric current can be kept short from the circuit board to the first internal electrode or the second internal electrode in each layer. This enables reduction in the equivalent series inductance of the multilayer capacitor.

The present invention surely realizes the low impedance across a wide band in the multilayer capacitor.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the multilayer capacitor and electronic device according to the present invention will be described below in detail with reference to the drawings.

Figure 1:
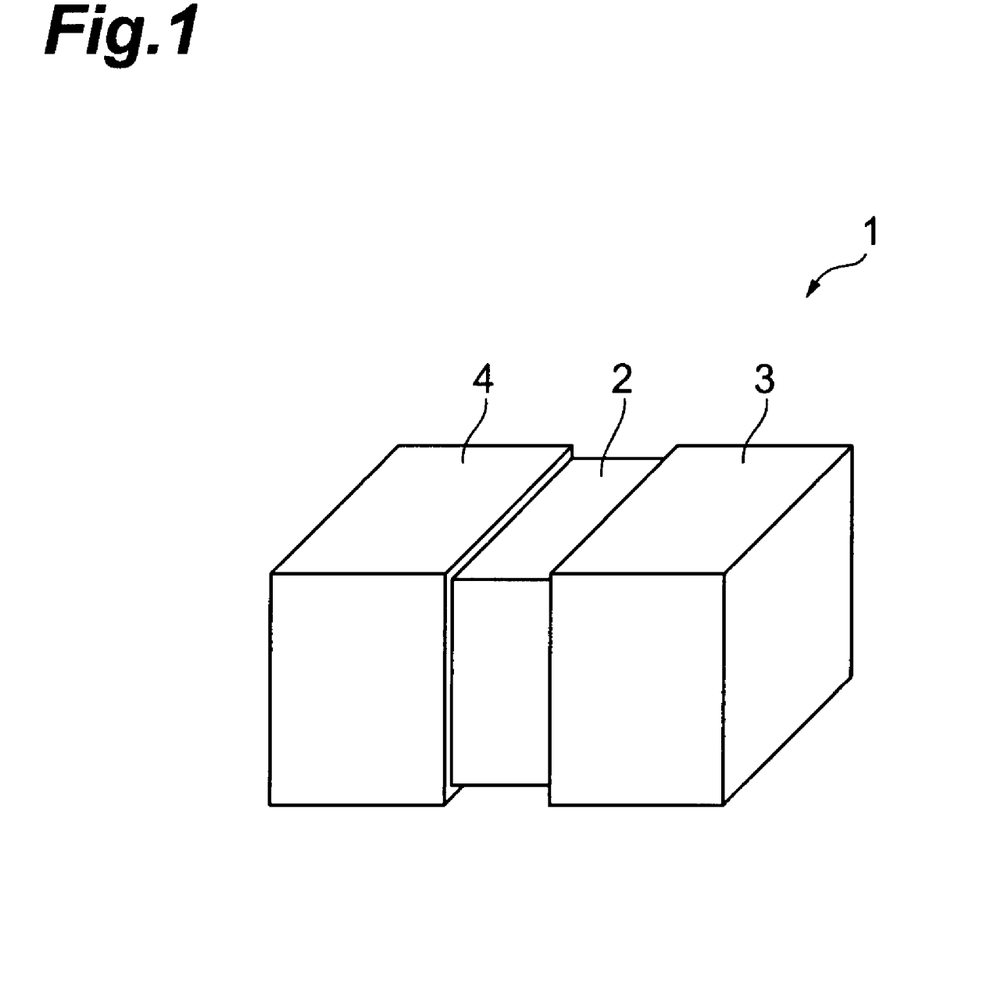
FIG. 1 is a perspective view showing a multilayer capacitor according to a first embodiment.

FIG. 1 is a perspective view showing the multilayer capacitor according to the first embodiment. In the same drawing, the multilayer capacitor 1 of the present embodiment has a laminate body 2 of a rectangular parallelepiped shape (which encompasses a nearly rectangular parallelepiped shape as well as a perfect rectangular parallelepiped shape), a terminal electrode 3 disposed on one longitudinal end side of this laminate body 2, and a terminal electrode 4 disposed on the other longitudinal end side of the laminate body 2.

The terminal electrode 3 is provided so as to cover one end face of the laminate body 2 and one-end-face-side portions in the four side faces of the laminate body 2, and the terminal electrode 4 is provided so as to cover the other end face of the laminate body 2 and other-end-face-side portions in the four side faces of the laminate body 2. The terminal electrodes 3, 4 are made, for example, by forming a Ni-plated layer and a Sn-plated layer in order on a baked electrode layer of Cu, Ag, or the like.

Figure 2:
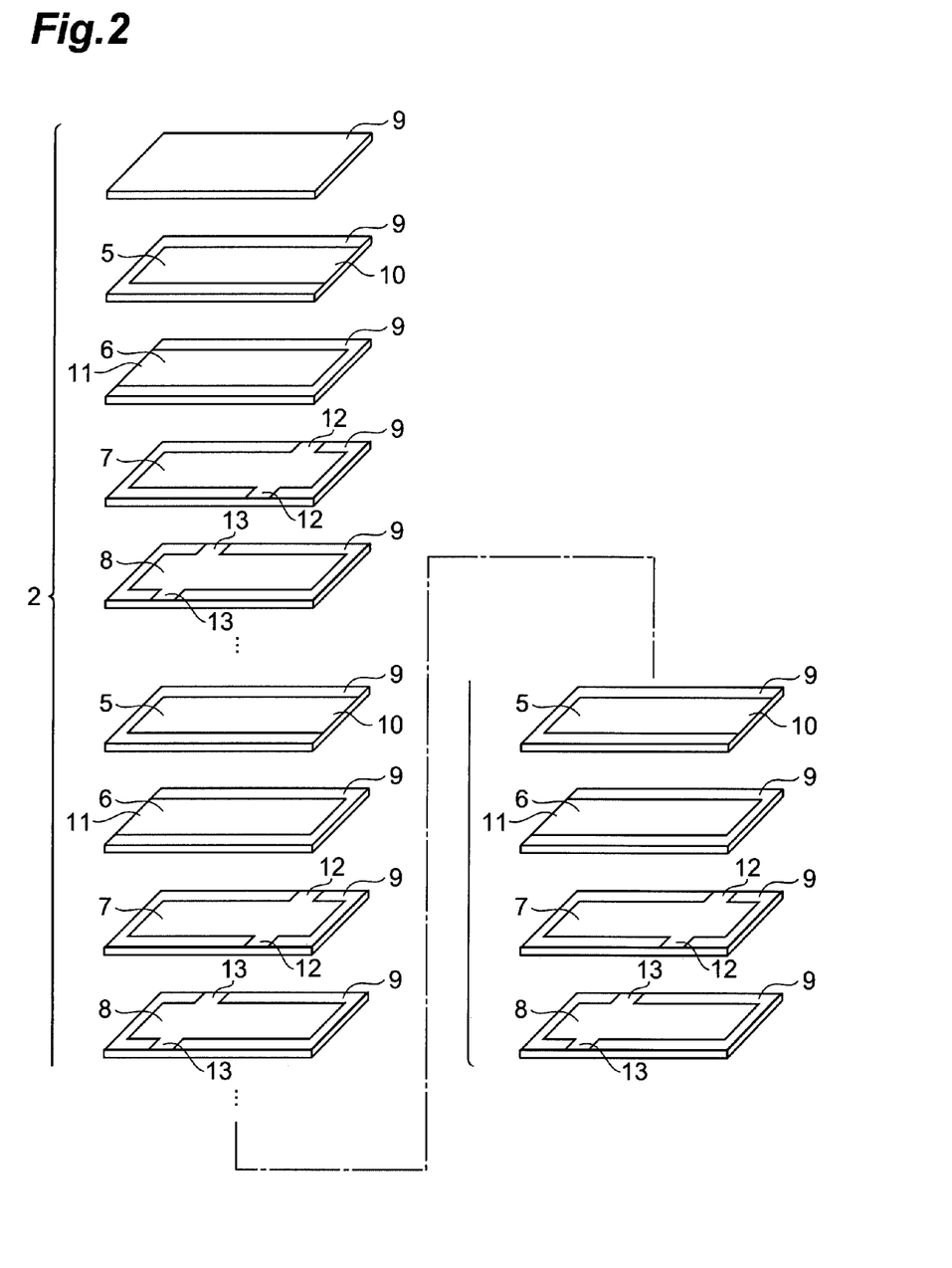
FIG. 2 is an exploded perspective view of a laminate body shown in FIG. 1.

FIG. 2 is an exploded perspective view of the laminate body 2. In the same drawings, the laminate body 2 has a structure in which plural types (four types herein) of internal electrodes (internal electrode layers) 5-8 of different shapes are alternately laminated from the top in each of plural groups with a dielectric layer 9 in between. A dielectric layer 9 is laid in the uppermost part and in the lowermost part of the laminate body 2. The internal electrodes 5-8 are made, for example, of Ni, a Ni alloy, or the like. The dielectric layers 9 are made, for example, of a dielectric material such as a $BaTiO_3$-based ceramic.

Figure 3:
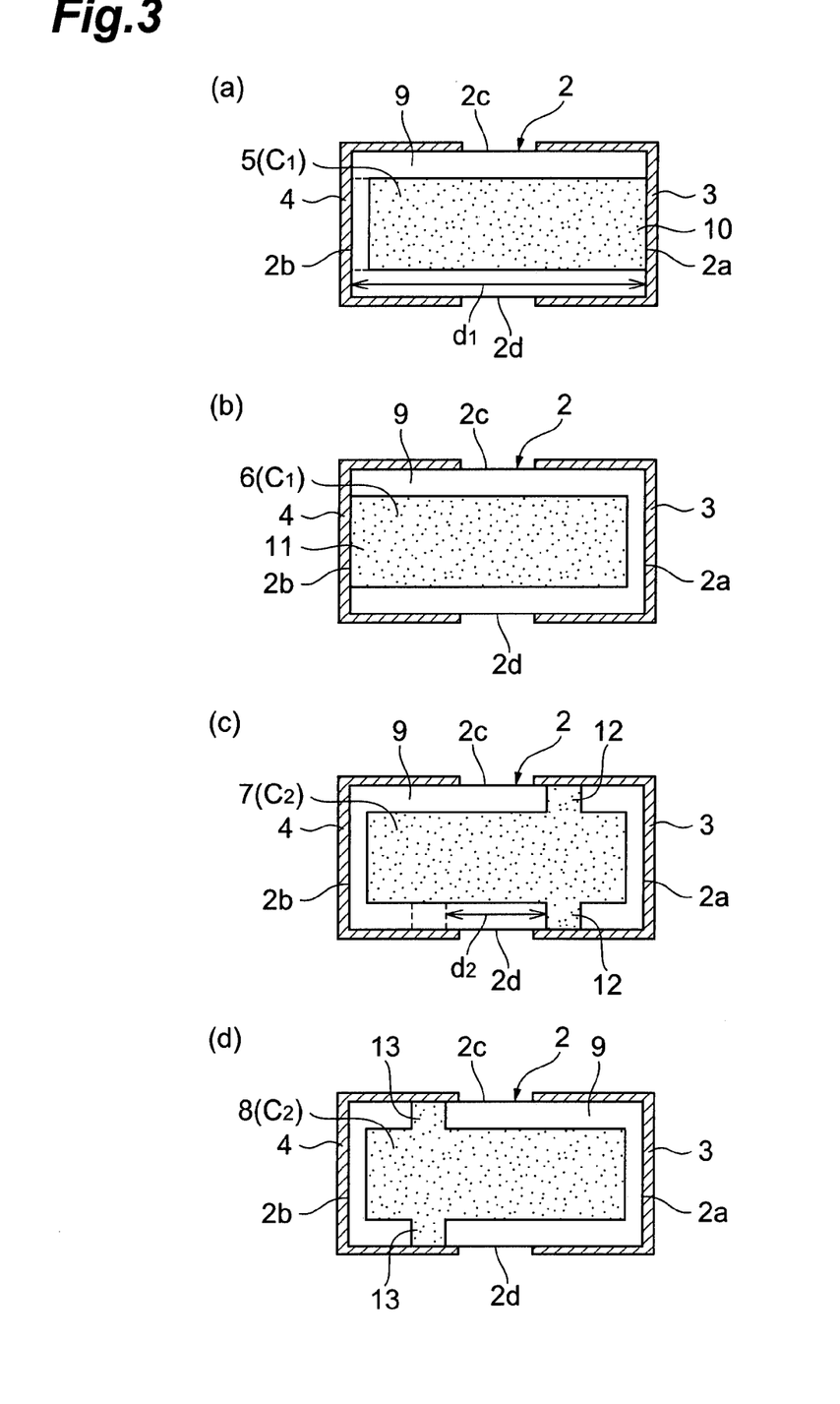
FIG. 3 is a sectional view showing internal electrode layers shown in FIG. 2.

As shown in FIGS. 2 and 3, an internal electrode 5 has a lead portion 10 led to one end face 2a of the laminate body 2 and connected to the terminal electrode 3. An internal electrode 6 has a lead portion 11 led to the other end face 2b of the laminate body 2 and connected to the terminal electrode 4. An internal electrode 7 has a pair of lead portions 12 respectively led to the opposing side faces 2c, 2d of the laminate body 2 and connected to the terminal electrode 3. These lead portions 12 are led to mutually corresponding positions in the side faces 2c, 2d. An internal electrode 8 has a pair of lead portions 13 led to the side faces 2c, 2d of the laminate body 2 and connected to the terminal electrode 4. These lead portions 13 are led to mutually corresponding positions in the side faces 2c, 2d. Overlap regions through the dielectric layer 9 in the internal electrodes 5-8 are of a rectangular shape.

For producing the multilayer capacitor 1 in this configuration, a ceramic paste (dielectric paste) containing ceramic powder of a $BaTiO_3$-based ceramic, an organic binder, and a solvent is first applied onto PET film, for example, by the doctor blade method, to prepare a plurality of green sheets of a rectangular shape which are supposed to become the aforementioned dielectric layers 9. Subsequently, the green sheets are dried, and thereafter electrode patterns to become the aforementioned internal electrodes 5-8 are formed on the upper surfaces of the green sheets, for example, by the screen printing method. Then the green sheets with the electrode patterns and the simple green sheets are laminated in a predetermined order to form a green laminate body. Subsequently, the green laminate body is subjected to press working and then to debindering and firing, thereby obtaining the aforementioned laminate body 2. Finally, the terminal electrodes 3, 4 are formed on the laminate body 2, for example, by the paste dipping method and electroplating method. The above completes the aforementioned multilayer capacitor 1.

In the multilayer capacitor 1 produced in this manner, there are capacitor $C_1$ and capacitor $C_2$ formed. The capacitor $C_1$ is composed of the internal electrodes 5, 6 of the mutually opposite polarities, and the dielectric layer 9 present between them. The capacitor $C_2$ is composed of the internal electrodes 7, 8 of the mutually opposite polarities, and the dielectric layer 9 present between them.

Now, where the equivalent series inductance (ESL) of the capacitor is represented by "L" and the capacitance by "C," the resonance frequency "fr" of the capacitor is expressed by an equation below.

$$fr = \frac{1}{2\pi\sqrt{LC}}$$

Therefore, the resonance frequency fr of the capacitor can be changed by altering values of the equivalent series inductance L and the capacitance C of the capacitor. At this time, since the equivalent series inductance L becomes lower with decrease in the distance between the lead portions of the two internal electrodes of the opposite polarities, the resonance frequency fr becomes higher.

In the multilayer capacitor 1 of the present embodiment, the lead portion 10 of the internal electrode 5 is led to the end face 2a of the laminate body 2 and the lead portions 12 of the internal electrode 7 with the same polarity as the internal electrode 5 are led to the side faces 2c, 2d of the laminate body 2; therefore, the forming positions of the lead portions 10, 12 are naturally different from each other. The lead portion 11 of the internal electrode 6 is led to the end face 2b of the laminate body 2 and the lead portions 13 of the internal electrode 8 with the same polarity as the internal electrode 6 are led to the side faces 2c, 2d of the laminate body 2; therefore, the forming positions of the lead portions 11, 13 are naturally different from each other.

A distance $d_1$ between the lead portions 10, 11 in the capacitor $C_1$ is longer than a distance $d_2$ between the lead portions 12, 13 in the capacitor $C_2$. Specifically, the distance $d_1$ between the lead portions 10, 11 refers to the shortest distance in a straight line between a connection point of the lead portion 10 with the terminal electrode 3 and a connection point of the lead portion 11 with the terminal electrode 4. The distance $d_2$ between the lead portions 12, 13 refers to the shortest distance in a straight line between a connection point of the lead portion 12 with the terminal electrode 3 and a connection point of the lead portion 13 with the terminal electrode 4.

For this reason, the equivalent series inductance (ESL) of the capacitor $C_2$ becomes lower than the ESL of the capacitor $C_1$, and thus the resonance frequency of the capacitor $C_2$ becomes higher than the resonance frequency of the capacitor $C_1$ from the aforementioned equation.

Figure 4:
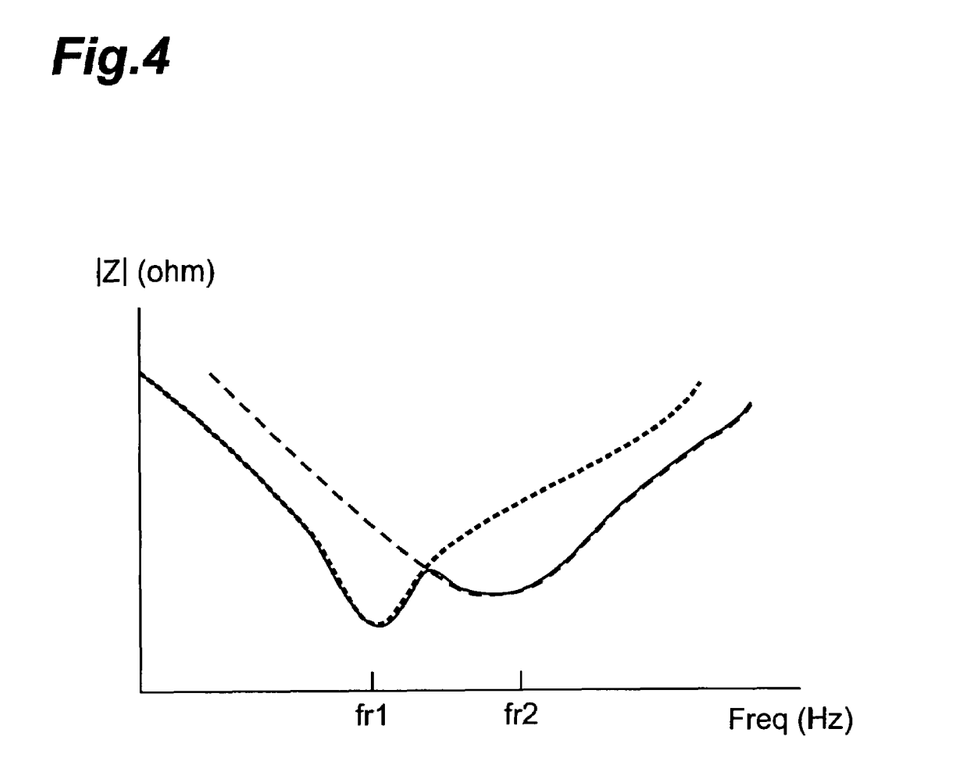
FIG. 4 is a graph showing a frequency-impedance characteristic of the multilayer capacitor shown in FIG. 1.

Specifically, the frequency-impedance characteristic of the multilayer capacitor 1 is as shown in FIG. 4. In the graph shown in FIG. 4, the horizontal axis indicates frequency, and the vertical axis impedance. In the graph a finely dashed line indicates a characteristic of the capacitor $C_1$ alone (resonance frequency $fr_1$) and a coarsely dashed line a characteristic of the capacitor $C_2$ alone (resonance frequency $fr_2$). Therefore, the frequency-impedance characteristic of the multilayer capacitor 1 is one passing a resonance point of impedance with the capacitor $C_1$ alone and a resonance point of impedance with the capacitor $C_2$ alone (cf. a solid line in the graph). Namely, the multilayer capacitor 1 has two resonance frequencies $fr_1$, $fr_2$.

Therefore, the multilayer capacitor 1 of the present embodiment has the low impedance across a wide frequency band including the resonance frequencies $fr_1$, $fr_2$, without need for the special structure in which two capacitors with different capacitances are integrally formed. This allows the multilayer capacitor 1 with the low impedance characteristic across the wide frequency band to be relatively easily realized in terms of the structure and production.

Figure 5:
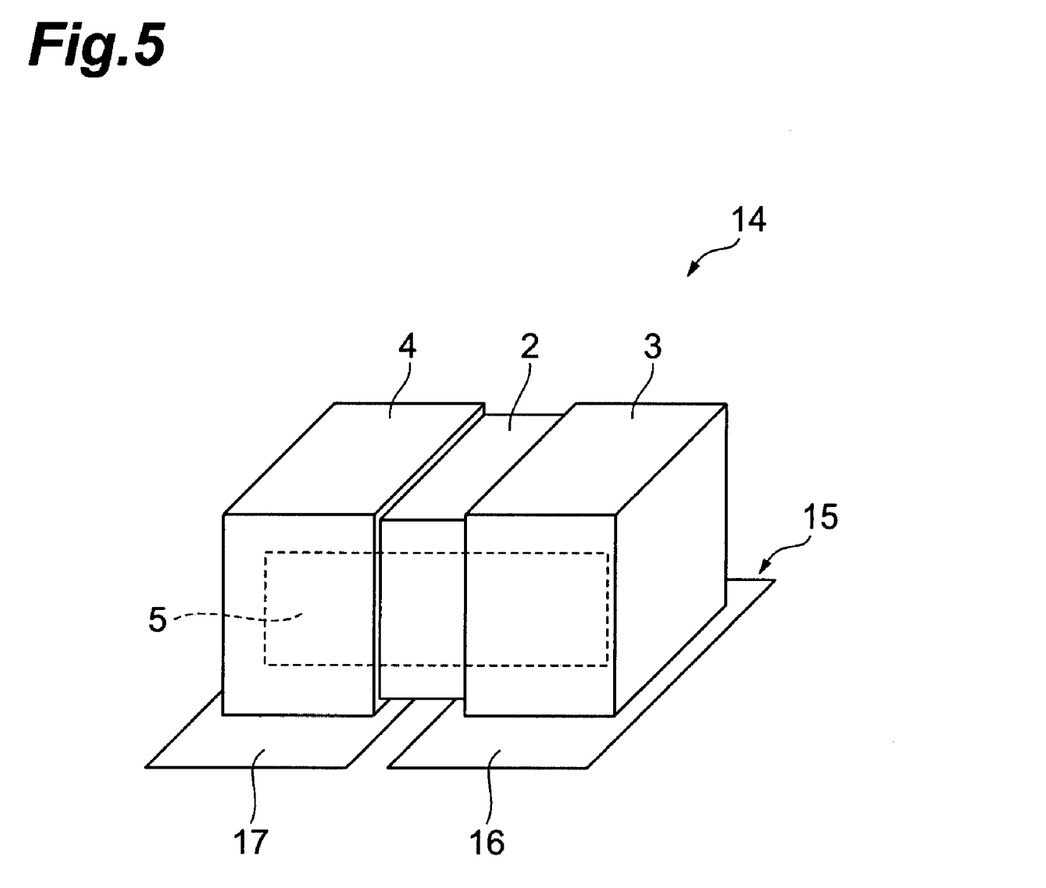
FIG. 5 is a perspective view showing a state in which the multilayer capacitor shown in FIG. 1 is mounted on a circuit board.

FIG. 5 is a perspective view showing an electronic device incorporating the above-described multilayer capacitor 1. In the same drawing, the electronic device 14 has a circuit board 15, and the multilayer capacitor 1 mounted on this circuit board 15. The circuit board 15 is provided with electrode patterns 16, 17 electrically connected to the terminal electrodes 3, 4, respectively, of the multilayer capacitor 1. The multilayer capacitor 1 is mounted on the circuit board 15 so that the internal electrodes 5-8 stay perpendicular (or vertical) to the circuit board 15.

In the electronic device 14 of this configuration, for example, supposing the terminal electrode 3 of the multilayer capacitor 1 is a positive (+) electrode and the terminal electrode 4 a negative (−) electrode, an electric current flows from the electrode pattern 16 of the circuit board 15 through the terminal electrode 3 to the internal electrodes 5, 7.

Incidentally, if the multilayer capacitor 1 is mounted on the circuit board 15 so that the internal electrodes 5-8 stay in an ordinary horizontal state relative to the circuit board 15, the flow path of electric current from the electrode pattern 16 to the internal electrodes 5-8 will become longer with increase in the heights of the internal electrodes 5-8 from the circuit board 15. For this reason, it leads to an increase in the ESL of the multilayer capacitor 1.

In contrast to it, the internal electrodes 5-8 stay vertical to the circuit board 15 in the present embodiment, and thus the lengths of flow paths of electric current from the electrode pattern 16 to the internal electrodes 5, 7 are identical to each other irrespective of the positions of the internal electrodes 5, 7. In addition, the lead portions 12 of the internal electrodes 7 are led to the side faces of the laminate body 2, and thus the electric current flows from the terminal electrode 3 through the lead portions 12 on the circuit board 15 side to the internal electrodes 7. This decreases roundabout flow of the electric current from the terminal electrode 3 into the internal electrodes 7. This results in decreasing the ESL of the multilayer capacitor 1.

Figure 6:
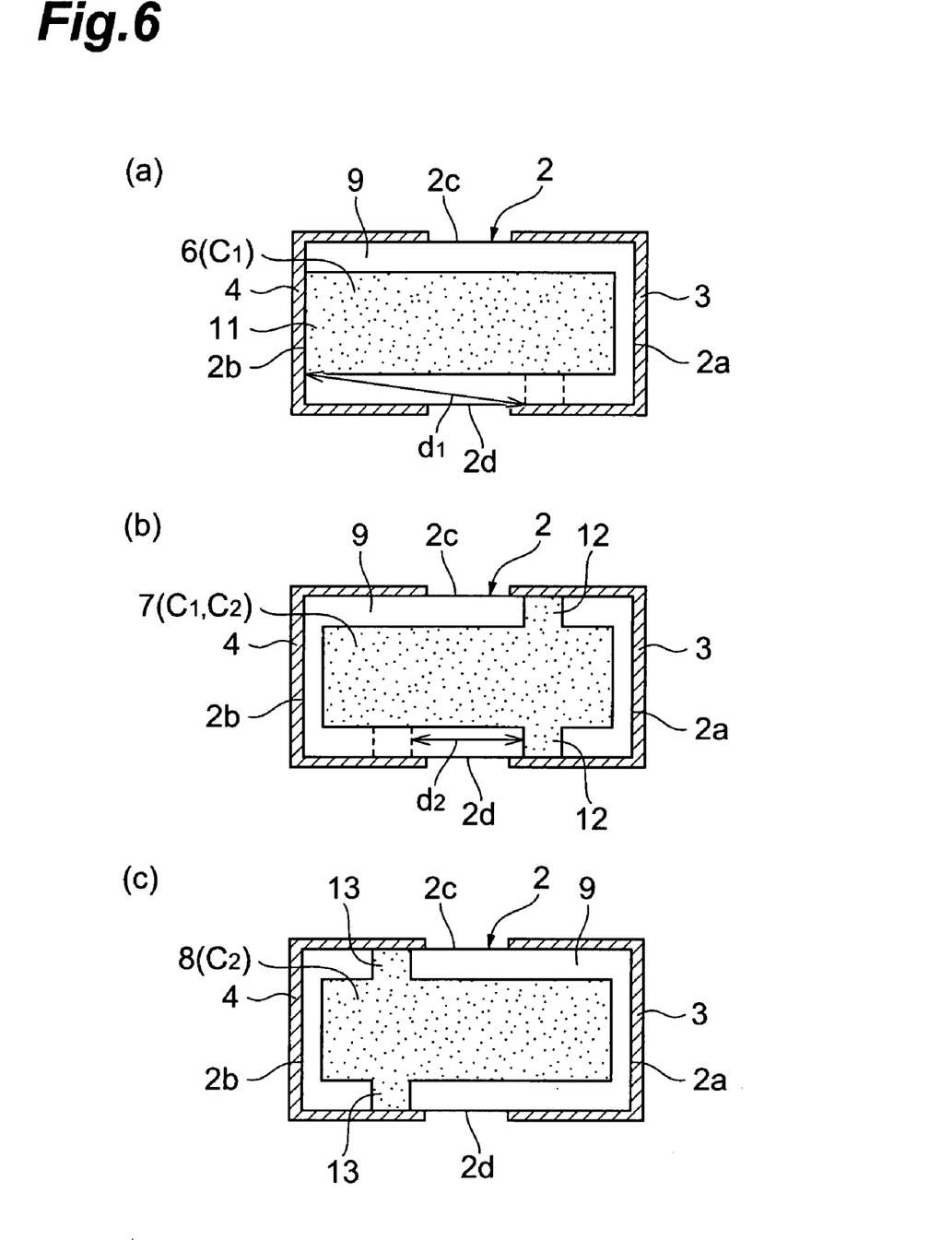
FIG. 6 is a sectional view showing internal electrode layers in a multilayer capacitor according to a second embodiment.

FIG. 6 is a sectional view showing the internal electrode layers in the multilayer capacitor according to the second embodiment. In the drawing, identical or equivalent elements to those in the first embodiment will be denoted by the same reference symbols, without redundant description.

In the same drawing, the laminate body 2 of the multilayer capacitor of the present embodiment has a structure in which internal electrodes 6-8 similar to those in the first embodiment are alternately laminated from the top in each of plural groups with a dielectric layer 9 in between.

In the multilayer capacitor of this configuration, there are capacitor $C_1$ and capacitor $C_2$ formed. The capacitor $C_1$ is composed of the internal electrodes 6, 7 of the mutually opposite polarities, and the dielectric layer 9 present between them. The capacitor $C_2$ is composed of the internal electrodes 7, 8 of the mutually opposite polarities, and the dielectric layer 9 present between them. Therefore, the two capacitors $C_1$, $C_2$ can be formed while the number of types of internal electrodes is smaller than in the first embodiment.

The distance $d_1$ between the lead portions 11, 12 in the capacitor $C_1$ is longer than the distance $d_2$ between the lead portions 12, 13 in the capacitor $C_2$. For this reason, the ESL of the capacitor $C_2$ is lower than the ESL of the capacitor $C_1$, as in the first embodiment, and the resonance frequency $fr_2$ of the capacitor $C_2$ is higher than the resonance frequency $fr_1$ of the capacitor $C_1$ (cf. FIG. 4 described above). Therefore, the multilayer capacitor has two resonance frequencies $fr_1$, $fr_2$, and thus achieves the low impedance across a wide frequency band.

Figure 7:
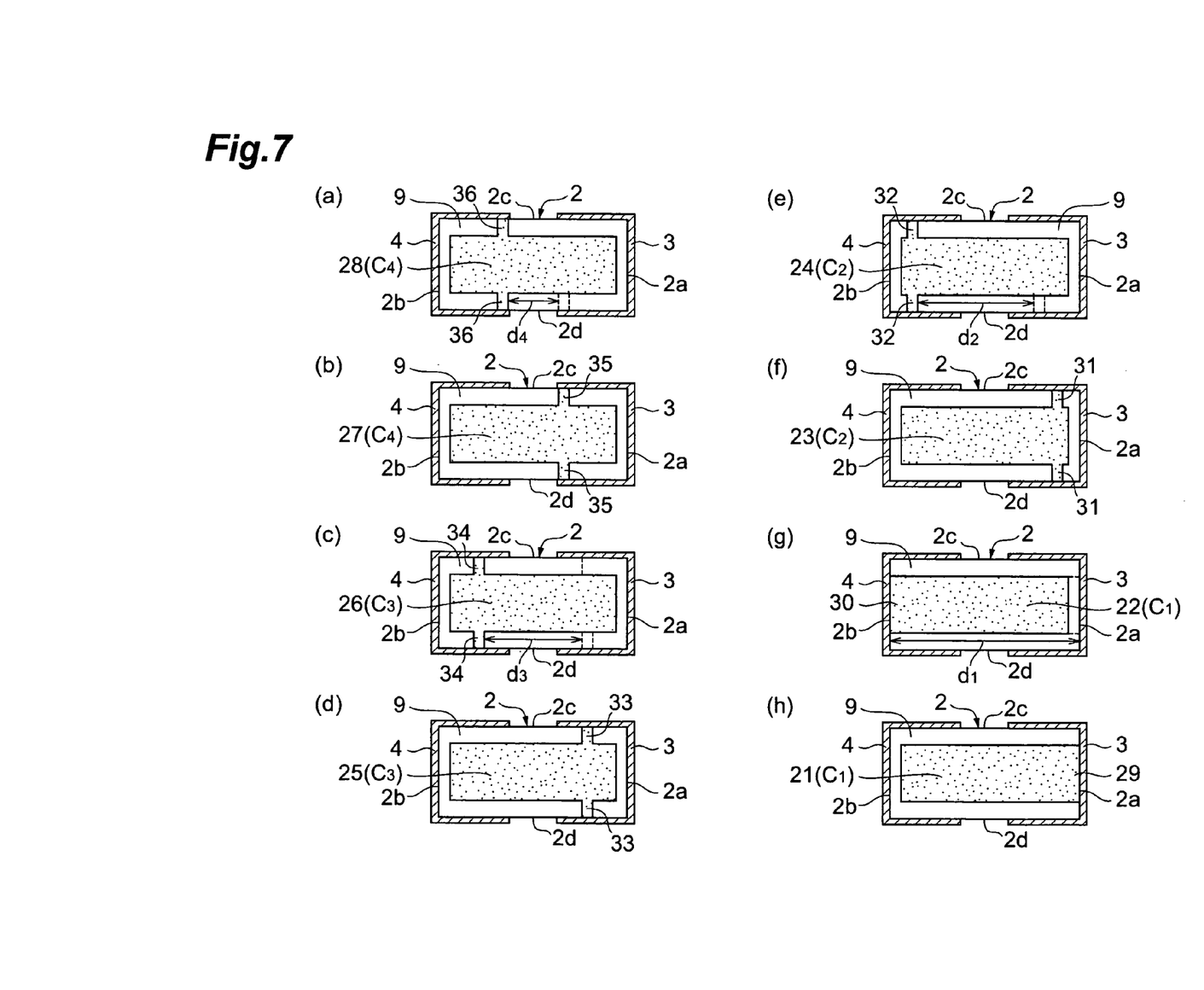
FIG. 7 is a sectional view showing internal electrode layers in a multilayer capacitor according to a third embodiment.

FIG. 7 is a sectional view showing the internal electrode layers in the multilayer capacitor according to the third embodiment. In the drawing, identical or equivalent elements to those in the first embodiment will be denoted by the same reference symbols, without redundant description.

In the same drawing, the laminate body 2 of the multilayer capacitor of the present embodiment has a structure in which internal electrodes (internal electrode layers) 21-28 are alternately laminated from the bottom in each of plural groups with a dielectric layer 9 in between.

An internal electrode 21 has a lead portion 29 led to the end face 2a of the laminate body 2 and connected to the terminal electrode 3. An internal electrode 22 has a lead portion 30 led to the end face 2b of the laminate body 2 and connected to the terminal electrode 4. An internal electrode 23 has a pair of lead portions 31 led to the side faces 2c, 2d of the laminate body 2 and connected to the terminal electrode 3. An internal electrode 24 has a pair of lead portions 32 led to the side faces 2c, 2d of the laminate body 2 and connected to the terminal electrode 4. An internal electrode 25 has a pair of lead portions 33 led to the side faces 2c, 2d of the laminate body 2 and connected to the terminal electrode 3. An internal electrode 26 has a pair of lead portions 34 led to the side faces 2c, 2d of the laminate body 2 and connected to the terminal electrode 4. An internal electrode 27 has a pair of lead portions 35 led to the side faces 2c, 2d of the laminate body 2 and connected to the terminal electrode 3. An internal electrode 28 has a pair of lead portions 36 led to the side faces 2c, 2d of the laminate body 2 and connected to the terminal electrode 4. Overlap regions through the dielectric layer 9 in the internal electrodes 21-28 are of a rectangular shape.

In the multilayer capacitor of this configuration, there are capacitor $C_1$, capacitor $C_2$, capacitor $C_3$, and capacitor $C_4$ formed. The capacitor $C_1$ is composed of the internal electrodes 21, 22 of the mutually opposite polarities, and the dielectric layer 9 present between them. The capacitor $C_2$ is composed of the internal electrodes 23, 24 of the mutually opposite polarities, and the dielectric layer 9 present between them. The capacitor $C_3$ is composed of the internal electrodes 25, 26 of the mutually opposite polarities, and the dielectric layer 9 present between them. The capacitor $C_4$ is composed of the internal electrodes 27, 28 of the mutually opposite polarities, and the dielectric layer 9 present between them.

The forming positions of the lead portions 31, 33, 35 connected to the terminal electrode 3 are shifted along the longitudinal direction of the laminate body 2. The forming positions of the lead portions 32, 34, 36 connected to the terminal electrode 4 are shifted along the longitudinal direction of the laminate body 2. For this reason, the below relation holds among the distance $d_1$ between the lead portions 29, 30 in the capacitor $C_1$, the distance $d_2$ between the lead portions 31, 32 in the capacitor $C_2$, the distance $d_3$ between the lead portions 33, 34 in the capacitor $C_3$, and the distance $d_4$ between the lead portions 35, 36 in the capacitor $C_4$.

$$d_1 > d_2 > d_3 > d_4$$

Therefore, the below relation holds among the equivalent series inductances (ESLs) $L_1$-$L_4$ of the capacitors $C_1$-$C_4$.

$$L_1 > L_2 > L_3 > L_4$$

Figure 8:
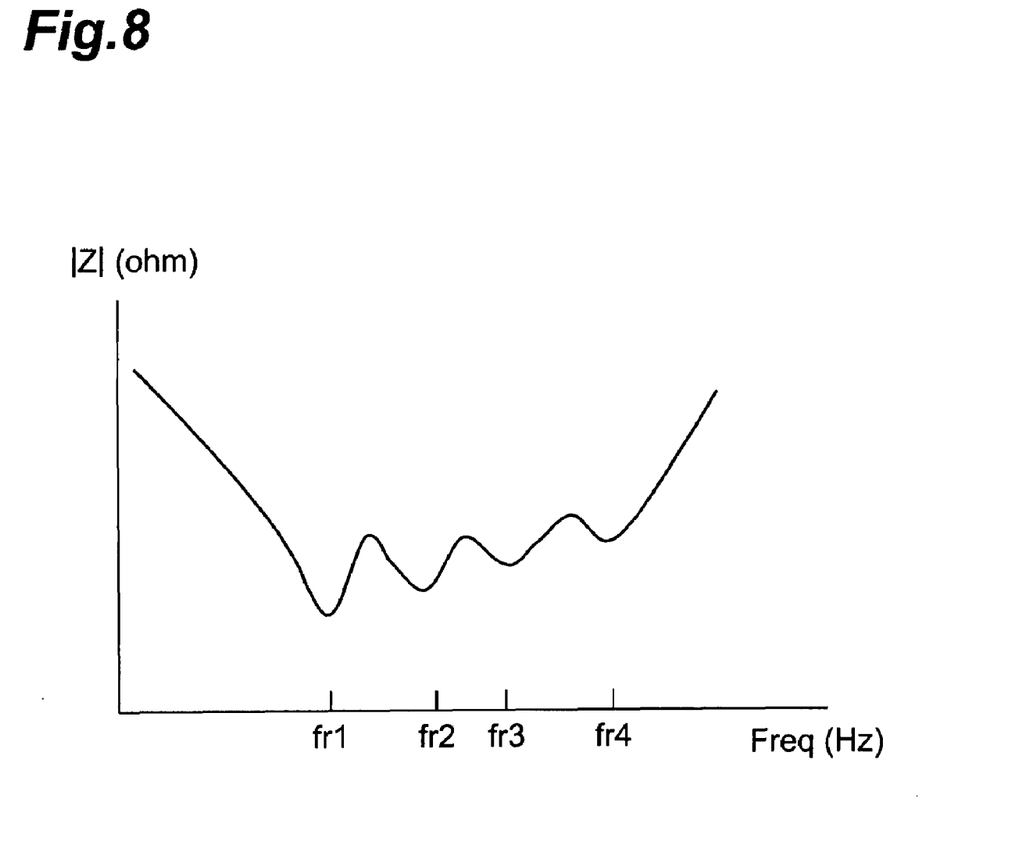
FIG. 8 is a graph showing a frequency-impedance characteristic of the multilayer capacitor shown in FIG. 7.

Accordingly, the resonance frequencies $fr_1$-$fr_4$ of the capacitors $C_1$-$C_4$ have the below relation, and the multilayer capacitor thus has the frequency-impedance characteristic as shown in FIG. 8.

$$fr_1 < fr_2 < fr_3 < fr_4$$

Since the multilayer capacitor has the four resonance frequencies $fr_1$-$fr_4$, the multilayer capacitor can be relatively easily obtained with the low impedance across a wider frequency band than in the first embodiment.

The above-described embodiment used the four types for each of the internal electrodes connected to the terminal electrodes 3, 4, but the types of internal electrodes connected to the terminal electrodes 3, 4 may be three types for each, or five or more types for each.

Figure 9:
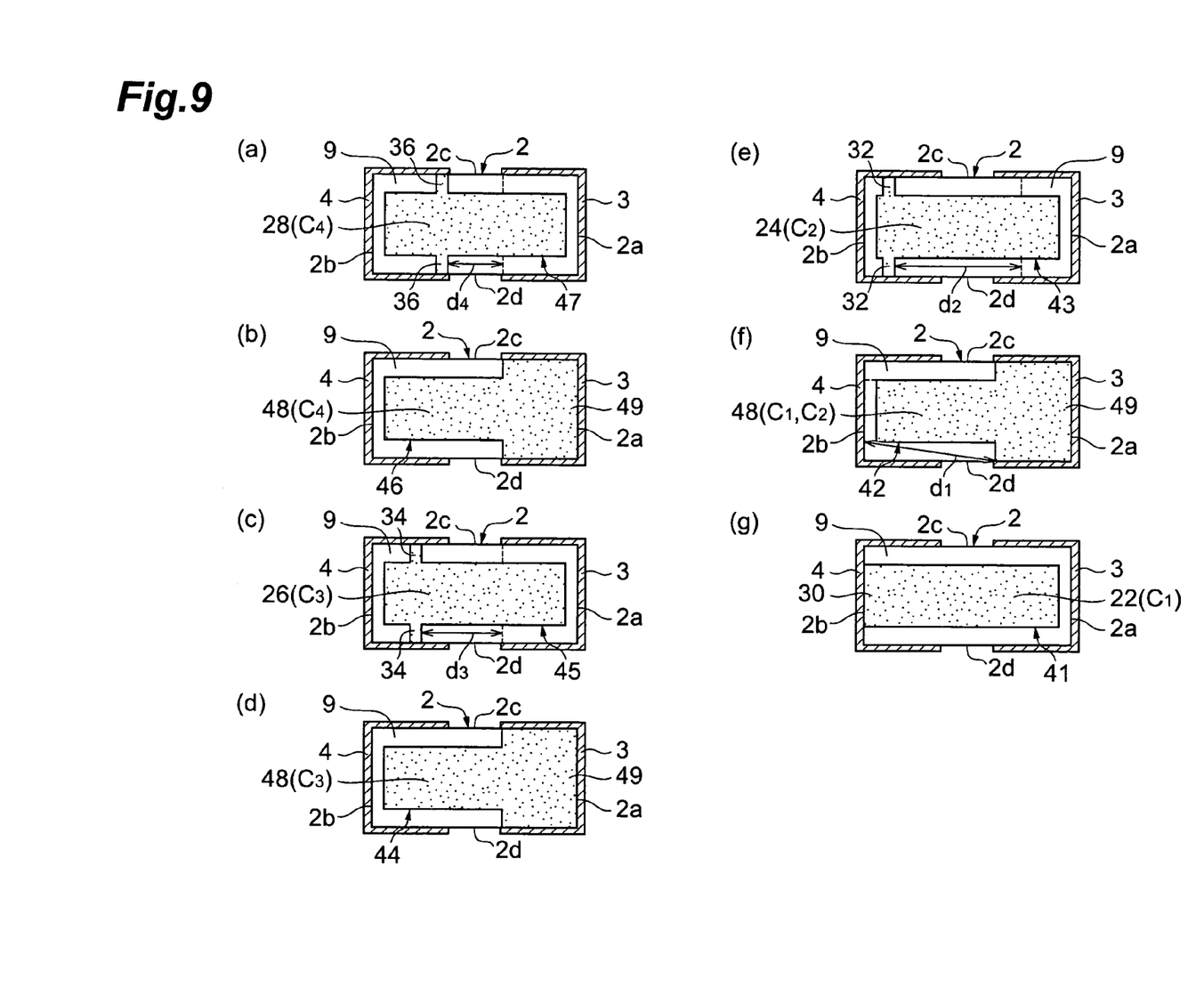
FIG. 9 is a sectional view showing internal electrode layers in a multilayer capacitor according to a fourth embodiment.

FIG. 9 is a sectional view showing the internal electrode layers in the multilayer capacitor according to the fourth embodiment. In the drawing, identical or equivalent elements to those in the first and third embodiments are denoted by the same reference symbols, without redundant description.

In the same drawing, the laminate body 2 of the multilayer capacitor of the present embodiment has a structure in which internal electrode layers 41-47 are alternately laminated from the bottom in each of plural groups with a dielectric layer 9 in between.

An internal electrode layer 41 is composed of an internal electrode 22 similar to that in the third embodiment; an internal electrode layer 43 is composed of an internal electrode 24 similar to that in the third embodiment; an internal electrode layer 45 is composed of an internal electrode 26 similar to that in the third embodiment; and an internal electrode layer 47 is composed of an internal electrode 28 similar to that in the third embodiment. Each of internal electrode layers 42, 44, 46 is composed of an internal electrode 48. The internal electrode 48 has a lead portion 49 led to the end face 2a and the side faces 2c, 2d of the laminate body 2 and connected to the terminal electrode 3. Overlap regions through the dielectric layer 9 in these internal electrodes are of a rectangular shape.

Since the lead portion 49 of the internal electrode 48 is led in the U-shape to the end face 2a and side faces 2c, 2d of the laminate body 2, it has a width larger than those of the other lead portions. For this reason, for example, in a case where the internal electrodes 48 are used as positive (+) electrodes, an electric current effectively flows from the wide region of the terminal electrode 3 into the internal electrodes 48, which can contribute to the reduction in the ESL of the multilayer capacitor.

In the multilayer capacitor of this configuration, there are capacitor $C_1$, capacitor $C_2$, capacitor $C_3$, and capacitor $C_4$ formed. The capacitor $C_1$ is composed of the internal electrodes 48, 22 (internal electrode layers 42, 41) of the mutually opposite polarities, and the dielectric layer 9 present between them. The capacitor $C_2$ is composed of the internal electrodes 48, 24 (internal electrode layers 42, 43) of the mutually opposite polarities, and the dielectric layer 9 present between them. The capacitor $C_3$ is composed of the internal electrodes 48, 26 (internal electrode layers 44, 45) of the mutually opposite polarities, and the dielectric layer 9 present between them. The capacitor $C_4$ is composed of the internal electrodes 48, 28 (internal electrode layers 46, 47) of the mutually opposite polarities, and the dielectric layer 9 present between them.

At this time, the below relation holds among the distance $d_1$ between the lead portions 49, 30 in the capacitor $C_1$, the distance $d_2$ between the lead portions 49, 32 in the capacitor $C_2$, the distance $d_3$ between the lead portions 49, 34 in the capacitor $C_3$, and the distance $d_4$ between the lead portions 49, 36 in the capacitor $C_4$.

$$d_1 > d_2 > d_3 > d_4$$

Namely, the multilayer capacitor has the four resonance frequencies $fr_1$-$fr_4$, as in the third embodiment, and thus can achieve the low impedance across a sufficiently wide frequency band.

The above-described embodiment used the four types of internal electrodes connected to the terminal electrode 4, but the types of internal electrodes connected to the terminal electrode 4 may be three types, or five or more types, of course.

Figure 10:
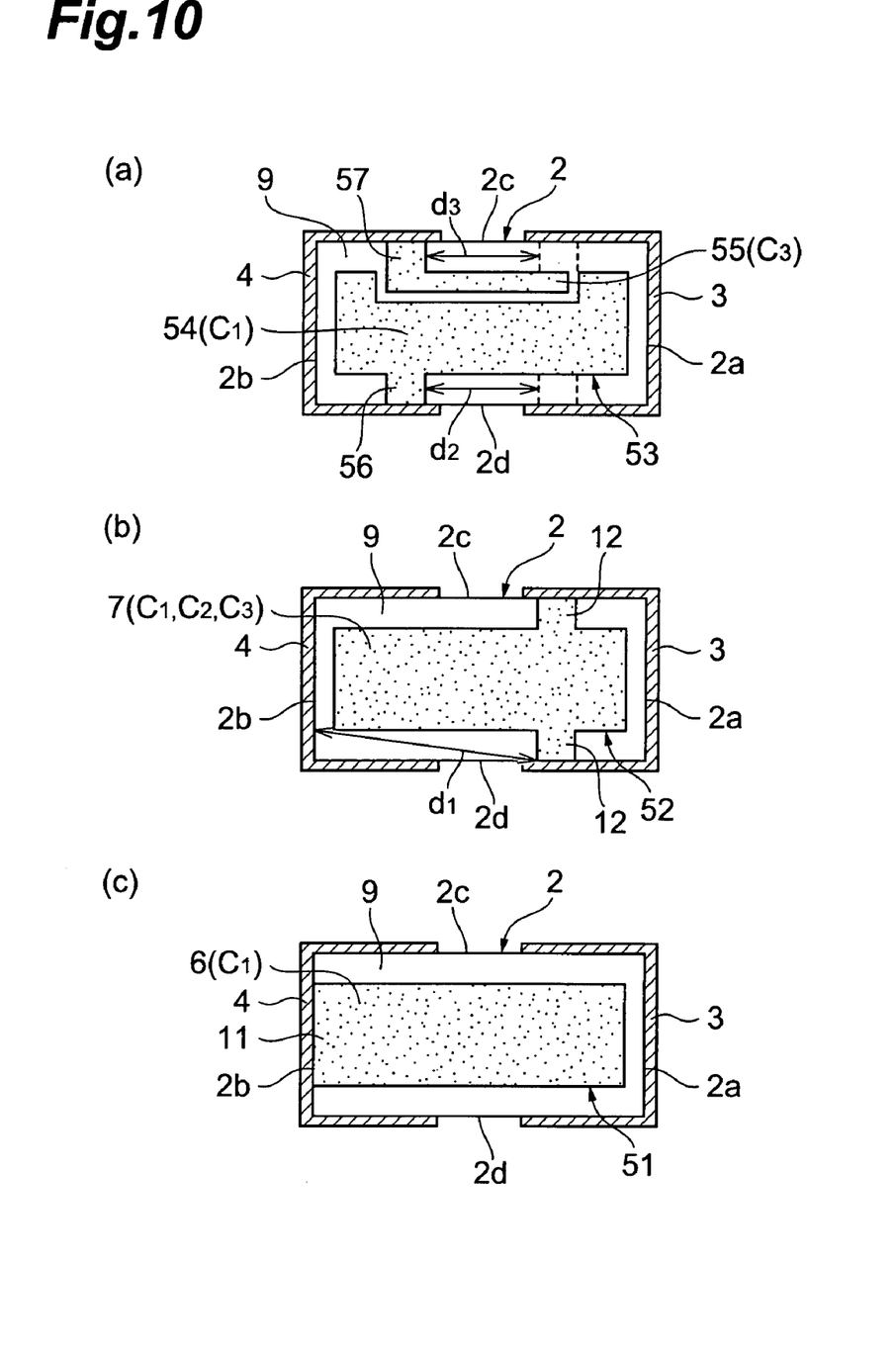
FIG. 10 is a sectional view showing internal electrode layers in a multilayer capacitor according to a fifth embodiment.

FIG. 10 is a sectional view showing the internal electrode layers in the multilayer capacitor according to the fifth embodiment. In the drawing, identical or equivalent elements to those in the first embodiment will be denoted by the same reference symbols, without redundant description.

In the same drawing, the laminate body 2 of the multilayer capacitor of the present embodiment has a structure in which internal electrode layers 51-53 are alternately laminated from the bottom in each of plural groups with a dielectric layer 9 in between.

An internal electrode layer 51 is composed of an internal electrode 6 similar to that in the first embodiment, and an internal electrode layer 52 is composed of an internal electrode 7 similar to that in the first embodiment. An internal electrode layer 53 is composed of internal electrodes 54, 55.

The internal electrode 54 has a lead portion 56 led to the side face $2d$ of the laminate body 2 and connected to the terminal electrode 4. The internal electrode 55 has a lead portion 57 led to the side face $2c$ of the laminate body 2 and connected to the terminal electrode 4. The lead portion 57 is formed at the position corresponding to the lead portion 56. The internal electrodes 54, 55 are formed substantially in a structure in which an internal electrode 8 similar to that in the first embodiment is divided into two regions. The internal electrode 54 has an area larger than the internal electrode 55.

In the multilayer capacitor of this configuration, there are capacitor $C_1$, capacitor $C_2$, and capacitor $C_3$ formed. The capacitor $C_1$ is composed of the internal electrodes 7, 6 of the mutually opposite polarities, and the dielectric layer 9 present between them. The capacitor $C_2$ is composed of the internal electrodes 7, 54 of the mutually opposite polarities, and the dielectric layer 9 present between them. The capacitor $C_3$ is composed of the internal electrodes 7, 55 of the mutually opposite polarities, and the dielectric layer 9 present between them.

The distance $d_2$ between the lead portions 12, 56 in the capacitor $C_2$ is equal to the distance $d_3$ between the lead portions 12, 57 in the capacitor $C_3$. The distance $d_1$ between the lead portions 11, 12 in the capacitor $C_1$ is larger than the distances $d_2$, $d_3$. For this reason, the ESL of the capacitor $C_2$ is equal to the ESL of the capacitor $C_3$, and the ESL of the capacitor $C_1$ is larger than the ESLs of the capacitors $C_2$, $C_3$.

However, since the area of the internal electrode 54 forming a part of the capacitor $C_2$ is larger than the area of the internal electrode 55 forming a part of the capacitor $C_3$, the capacitance of the capacitor $C_2$ is larger than that of the capacitor $C_3$.

Figure 11:
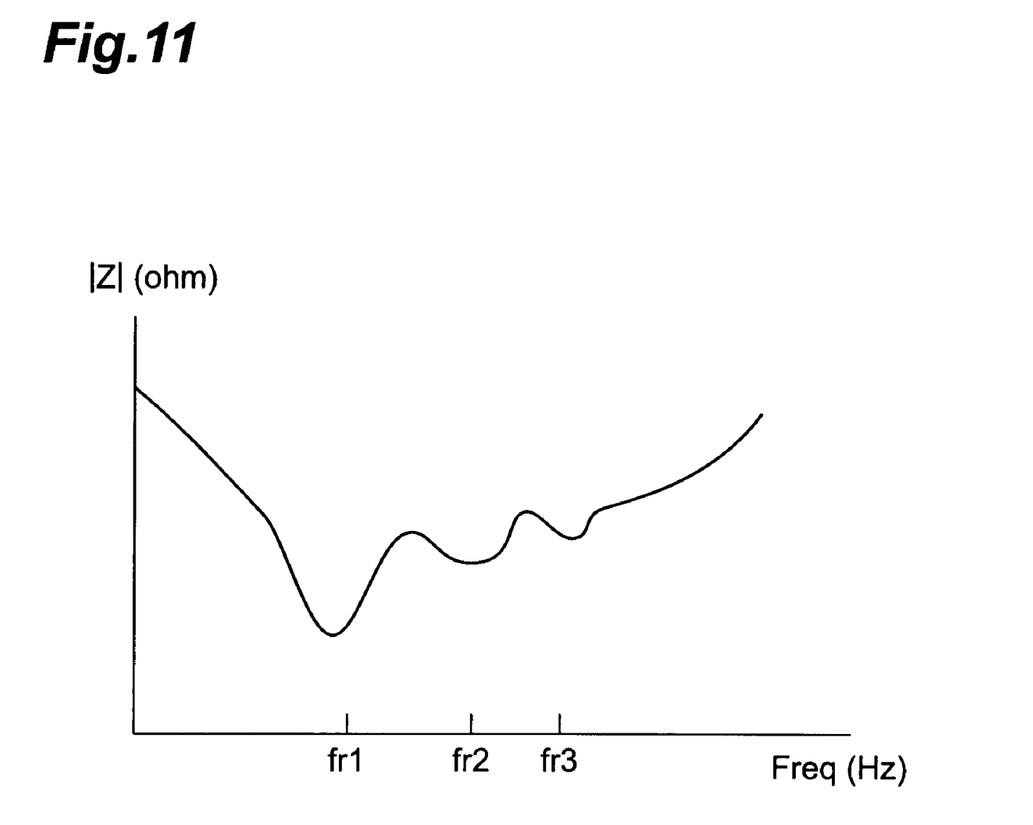
FIG. 11 is a graph showing a frequency-impedance characteristic of the multilayer capacitor shown in FIG. 10.

As a result, the resonance frequencies $fr_1$-$fr_3$ of the capacitors $C_1$-$C_3$ have the below relation, and the multilayer capacitor comes to have the frequency-impedance characteristic as shown in FIG. 11.

$$fr_1 < fr_2 < fr_3$$

Since the multilayer capacitor has the three resonance frequencies $fr_1$-$fr_3$ as described above, the low impedance can be achieved across a wide frequency band. Since the internal electrode layer 53 is composed of the internal electrodes 54, 55 with the different areas, the multilayer capacitor with the resonance frequencies $fr_1$-$fr_3$ can be obtained, without increase in the number of internal electrode layers more than necessary.

The above-described embodiment used the structure of the internal electrode layer 53 composed of the two internal electrodes, but it is also possible to adopt a structure consisting of three or more internal electrodes. The internal electrode layer 51 may also be constructed in a structure consisting of a plurality of internal electrodes.

Figure 12:
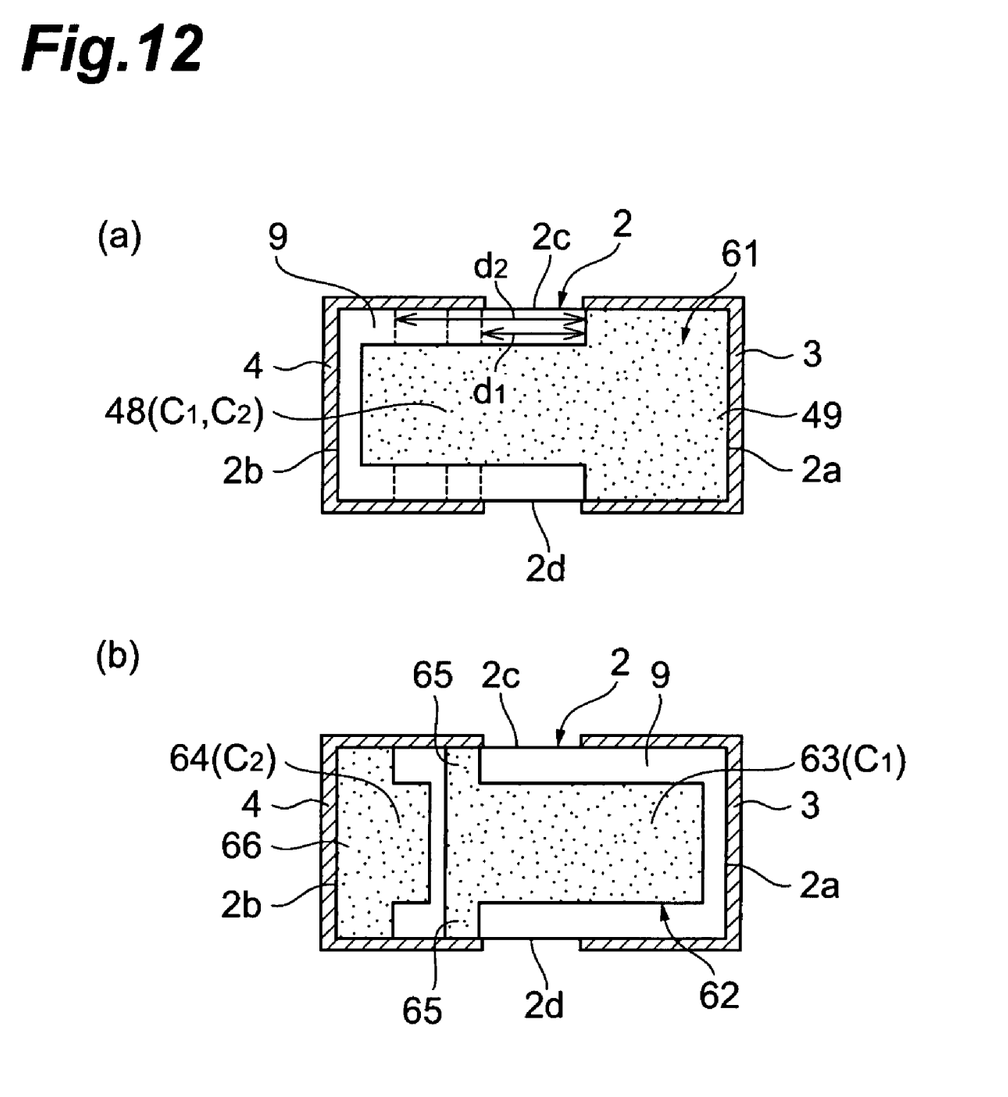
FIG. 12 is a sectional view showing internal electrode layers in a multilayer capacitor according to a sixth embodiment.

FIG. 12 is a sectional view showing the internal electrode layers in the multilayer capacitor according to the sixth embodiment. In the drawing, identical or equivalent elements to those in the first and fourth embodiments will be denoted by the same reference symbols, without redundant description.

In the same drawing, the laminate body 2 of the multilayer capacitor of the present embodiment has a structure in which internal electrode layers 61, 62 are alternately laminated from the top in each of plural groups with a dielectric layer 9 in between.

An internal electrode layer 61 is composed of an internal electrode 48 similar to that in the fourth embodiment. An internal electrode layer 62 is composed of internal electrodes 63, 64 formed alongside in the longitudinal direction of the laminate body 2. The internal electrode 63 has a pair of lead portions 65 led to the side faces $2c$, $2d$ of the laminate body 2 and connected to the terminal electrode 4. The internal electrode 64 has a lead portion 66 led to the side faces $2c$, $2d$ of the laminate body 2 and connected to the terminal electrode 4. The internal electrode 63 has an area larger than the internal electrode 64.

In the multilayer capacitor of this configuration, there are capacitor $C_1$ and capacitor $C_2$ formed. The capacitor $C_1$ is composed of the internal electrodes 48, 63 of the mutually opposite polarities, and the dielectric layer 9 present between them. The capacitor $C_2$ is composed of the internal electrodes 48, 64 of the mutually opposite polarities, and the dielectric layer 9 present between them.

The distance $d_2$ between the lead portions 49, 66 in the capacitor $C_2$ is larger than the distance $d_1$ between the lead portions 49, 65 in the capacitor $C_1$. For this reason, the ESL of the capacitor $C_2$ is larger than the ESL of the capacitor $C_1$. However, the area of the internal electrode 63 forming a part of the capacitor $C_1$ is larger than the area of the internal electrode 64 forming a part of the capacitor $C_2$, and thus the capacitance of the capacitor $C_1$ is larger than the capacitance of the capacitor $C_2$.

At this time, when influence of the capacitances due to the areas of the internal electrodes 63, 64 is greater than influence of the ESLs due to the distance $d_1$ between the lead portions 49, 65 and the distance $d_2$ between the lead portions 49, 66, the resonance frequency $fr_1$ of the capacitor $C_1$ becomes lower than the resonance frequency $fr_2$ of the capacitor $C_2$, and it results in obtaining the frequency-impedance characteristic as shown in the foregoing FIG. 4.

In the present embodiment as described above, the capacitances of the capacitors $C_1$, $C_2$ are also appropriately adjusted in addition to the adjustment of the ESLs of the capacitors $C_1$, $C_2$, whereby the multilayer capacitor with two adequate resonance frequencies can be surely obtained. This allows us to obtain the multilayer capacitor with low impedance across a wide frequency band. Since the multilayer capacitor with the two resonance frequencies is obtained through the use of only the two types of internal electrode layers 61, 62, it becomes feasible to achieve simplification and miniaturization of the multilayer capacitor.

The above-described embodiment adopted the structure in which the internal electrode layer 62 was composed of the two internal electrodes 63, 64, but it is also possible to adopt a structure consisting of three or more internal electrodes, of course.

The preferred embodiments of the multilayer capacitor according to the present invention were described above, but it is noted that the present invention is by no means limited to the above embodiments. For example, the shapes of the internal electrodes, and the forming positions, shapes, numbers, etc. of the lead portions of the internal electrodes are not limited, particularly, to those in the above embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
    a laminate body in which a first internal electrode and a second internal electrode are alternately laminated with a dielectric layer in between;
    a first terminal electrode provided on one end side of the laminate body; and
    a second terminal electrode provided on another end side of the laminate body;
    wherein the first internal electrode has a first lead portion connected to the first terminal electrode;
    wherein the second internal electrode has a second lead portion connected to the second terminal electrode;
    wherein the first internal electrode comprises plural types of first internal electrodes and the plural types of first internal electrodes have their respective first lead portions at different positions;
    wherein distances between the first lead portions of the respective types of the first internal electrodes and the second lead portion are different from each other.

2. The multilayer capacitor according to claim 1,
    wherein the second internal electrode comprises plural types of second internal electrodes, and the plural types of second internal electrodes have their respective second lead portions at different positions;
    wherein distances between the first lead portions of the respective types of the first internal electrodes and the second lead portions of the respective types of the second internal electrodes are different from each other.

3. The multilayer capacitor according to claim 1,
    wherein at least one type among the plural types of first internal electrodes is divided into a plurality of internal electrodes in a single layer of the laminate body;
    wherein each of the divided internal electrodes has the first lead portion;
    wherein areas of the respective divided internal electrodes are different from each other.

4. The multilayer capacitor according to claim 1,
    wherein the plural types of first internal electrodes are formed in a single layer of the laminate body.

5. The multilayer capacitor according to claim 4,
    wherein areas of the respective types of first internal electrodes are different from each other.

6. An electronic device comprising a circuit board, and a multilayer capacitor mounted on the circuit board,
    wherein the multilayer capacitor comprises a laminate body in which a first internal electrode and a second internal electrode are alternately laminated with a dielectric layer in between, a first terminal electrode provided on one end side of the laminate body, and a second terminal electrode provided on another end side of the laminate body;
    wherein the first internal electrode has a first lead portion connected to the first terminal electrode;
    wherein the second internal electrode has a second lead portion connected to the second terminal electrode;
    wherein the first internal electrode comprises plural types of first internal electrodes and the plural types of first internal electrodes have their respective first lead portions at different positions;
    wherein distances between the first lead portions of the respective types of first internal electrodes and the second lead portion are different from each other;
    wherein the multilayer capacitor is mounted on the circuit board so that the first and second internal electrodes stay vertical to the circuit board.

* * * * *